(12) United States Patent
Porter

(10) Patent No.: US 6,920,181 B1
(45) Date of Patent: Jul. 19, 2005

(54) METHOD FOR SYNCHRONIZING AUDIO AND VIDEO STREAMS

(75) Inventor: Todd M. Porter, Dallas, TX (US)

(73) Assignee: Todd Porter, Dallas, TX (US)

( * ) Notice: Subject to any disclaimer, the term of this patent is extended or adjusted under 35 U.S.C. 154(b) by 804 days.

(21) Appl. No.: 09/664,662

(22) Filed: Sep. 19, 2000

(51) Int. Cl.⁷ .............................................. H04N 7/12
(52) U.S. Cl. ............................................. 375/240.28
(58) Field of Search ...................... 375/240.28, 240.01, 375/240.13–240.15, 240.21, 240.08; 348/423.1, 425.4

(56) References Cited

U.S. PATENT DOCUMENTS

| | | | | |
|---|---|---|---|---|
| 5,652,615 A | * | 7/1997 | Bryant et al. .................. | 725/35 |
| 5,745,637 A | | 4/1998 | Phillips et al. | |
| 5,748,842 A | | 5/1998 | Holmes et al. | |
| 5,903,264 A | * | 5/1999 | Moeller et al. ............. | 345/719 |
| 5,913,031 A | * | 6/1999 | Blanchard .................... | 709/204 |
| 5,953,488 A | * | 9/1999 | Seto ............................ | 386/109 |
| 5,959,684 A | | 9/1999 | Tan et al. | |
| 6,049,769 A | | 4/2000 | Holmes et al. | |
| 6,154,600 A | * | 11/2000 | Newman et al. ............... | 386/4 |
| 6,154,771 A | * | 11/2000 | Rangan et al. .............. | 709/217 |
| 6,404,978 B1 | * | 6/2002 | Abe ............................. | 386/55 |
| 6,449,653 B2 | * | 9/2002 | Klemets et al. .............. | 709/231 |
| 6,628,303 B1 | * | 9/2003 | Foreman et al. ............ | 345/723 |
| 6,650,826 B1 | * | 11/2003 | Hatta ............................ | 386/52 |
| 6,678,332 B1 | * | 1/2004 | Gardere et al. ......... | 375/240.26 |
| 2002/0154156 A1 | * | 10/2002 | Moriwake et al. .......... | 345/716 |

OTHER PUBLICATIONS

A book titled—Video Compression by Peter D. Symes, and published by Mcgraw—Hill in 1998, pp. 189–243.
A book titled—Digital Video and Audio Compression by Stephen J. Solari, and published by Mcgraw—Hill in 1997, pp. 213–232.

* cited by examiner

Primary Examiner—Chris Kelley
Assistant Examiner—Dave Czekaj
(74) Attorney, Agent, or Firm—Patton Boggs LLP

(57) ABSTRACT

A method for synchronizing an audio stream with a variable bit rate video stream is performed by sampling a plurality of markers in the video stream to obtain and store a time stamp and a memory stamp for each marker. A user enters a selected time position for the video stream, and a video byte location is found by reviewing the stored values of the time stamps and the memory stamps. An audio byte location is calculated using the selected time position, the total file size of the audio stream, and the total amount of time required to play the audio stream. To play the audio and video streams synchronously, the audio stream is started from the audio byte location, while the video stream is concurrently started from the video byte location.

4 Claims, 5 Drawing Sheets

GVP Table

| GOP TIME STAMP | GOP MEMORY STAMP |
|---|---|
| 0.0 | H 0000 0000 0000 001E |
| 0.5 | H 0000 0000 0000 0028 |
| 1.0 | H 0000 0000 0000 0030 |
| 1.5 | H 0000 0000 0000 0041 |
| 2.0 | H 0000 0000 0000 004A |
| 2.5 | H 0000 0000 0000 0050 |
| 3.0 | H 0000 0000 0000 005F |
| 3.5 | H 0000 0000 0000 006E |
| 4.0 | H 0000 0000 0000 0078 |

FIG. 3

METHOD FOR SYNCHRONIZING AUDIO AND VIDEO STREAMS

BACKGROUND OF THE INVENTION

1. Field of the Invention

This invention relates in general to a method for synchronizing elementary audio and video streams and in particular to a software system executed on a computer for synchronizing audio and video streams during a video editing process.

2. Description of Related Art

The rapid development of electronic hardware and software has spawned a digital revolution. Video and audio production and transmission are technologies that have certainly benefitted from the effects of the digital age. By converting audio and video files to a digital format, the files can be easily transferred and copied many times with little or no degradation of the original recording quality.

Both audio and video files require large amounts of data to accurately represent the audio or video associated with the files. Since file transfer speed and computer processing speed are usually a concern, it is desired to reduce the file size of audio and video files as much as possible. File reduction is accomplished by using the process of compression. Compression saves storage space and transmission time. Compression processes take advantage of the fact that information exhibits order and patterning. When order and patterning can be extracted from a group of information, the information can be represented and transmitted using less data than needed for the original information.

One of the most straightforward ways to compress data is to recognize pattern structures within the data set and replace the patterns with shorter data sets that express the pattern structure. The most common compression of this sort is called "run-length encoding." Certain types of data, and in particular visual data, often include long strings of ones (or zeroes), to express an unvarying condition. Run length encoding searches for "runs" of a single data type, and creates a code that expresses the length of the run, as well as the parity of the bits. As an oversimplified example, the data set "0000 0000" could be compressed as "8 0," signifying eight bits with a parity of zero, while the data set "1111 1111" could be compressed as "8 1"

Video data can also be compressed by recognizing patterns that naturally occur because of the way video is formatted. For example, sometimes video includes scenes where the visual image is unchanged for several frames or more. The data representing the repeated video frame may be too complex for run-length or other forms of compression within the frame, but substantial compression can still be obtained by writing the frame data once, and adding code to represent the number of times the frame is repeated.

Another form of video compression takes advantage of the tendency in video (especially on a frame-by-frame level) to avoid abrupt changes in the visual image that is generated. Rather, each frame is in most cases very similar to the frame that came before and to the one that will follow. Video compression can be achieved by fully representing a first frame and then appending data to represent each bit of data that changed in the next frame. This can be continued for each frame, perhaps until noting the changes in a frame requires more data than writing the frame out fully, at which point the compression process can begin again with the new frame as a starting point.

Compression is often described as being "lossless" or "lossy." Lossless compression removes redundant information. An example of lossless compression is run-length encoding. As mentioned previously, no information is discarded in run-length encoding; rather, information is just rearranged and represented in a more efficient manner.

The goal of lossy compression is to remove irrelevant information. Lossy compression relies on the fact that some information in an original video stream cannot be perceived by a person viewing the video. A lossy compression algorithm will remove these imperceptible pieces of information. Lossy compression will sometimes also remove information that is "close to irrelevant" if it is determined that the benefit of the data savings outweighs the detriment caused by the perceived loss in quality.

A common compression format for video files is the MPEG-2 standard, which was developed by the Moving Picture Experts Group. FIG. 1 schematically illustrates a segment of an MPEG-2 video file 11 and an AC-3 audio file 13. Video file 11 and its corresponding audio file 13 are representative of elementary video and audio files that have undergone compression. Video files, such as file 11, that have been compressed by the MPEG-2 standard are variable bit rate files. Variable bit rate files are files that may have different amounts of data associated with each second of video. When the frames in a portion of a video steam are very similar to surrounding frames, less memory is needed to accurately represent those frames than when the frames are very different from the surrounding frames. Hence, the allocation of bits to a particular segment of video can vary at different places in the video. Audio compression is accomplished using a constant bit rate process, wherein the same number of bits are allocated to each second of audio.

Video file 11 has twelve seconds of video stored in 1,000,000 bytes. Audio file 13, which is a constant bit rate file, has nine seconds of audio stored in the same 1,000,000 bytes. In order to properly play video file 11 and audio file 13, it is desired to have the sound of the audio file "synchronized" with the video of the video file. Therefore, any sound at the sixth second of the audio file should be played simultaneous with any video at the sixth second of the video file.

As long as both files are started from the beginning, the video and audio are synched. The problem arises when a user attempts to "jump" to a particular portion of the audio and video. Jumping to a particular point in the audio and video files is necessary in any non-linear editing environment. Users attempting to edit video commonly need to fast-forward to a given point in the audio and video streams and play from that point.

Most applications currently available for non-linear editing assume that a given file size yields a given number of seconds of video and audio. When a user attempts to fast-forward to a desired in-point in the video and audio files, the user generally indicates the desired in-point by entering a time position, which represents the amount of time elapsed in the video or audio file. The application then uses a formula to calculate the desired in-point in terms of bytes. The formula takes the time position entered by the user and multiplies it by the length (in bytes) of each second of audio and video. This formula based approach works fine for uncompressed audio and video files and compressed audio files where the files are arranged with a constant bit rate. However, a formula based approach does not work properly on compressed video files, which are variable bit rate.

Referring still to FIG. 1, an arrow 15 illustrates the result of using the formula-based approach to calculate an in-point for a user-defined time position. The prior art software represented in FIG. 1 has attempted to fast-forward both video file 11 and audio file 13 to an in-point just prior to the ninth second of audio and video. Since audio file 13 is a constant bit rate file, the calculation quickly identifies the correct byte location for the ninth second of audio. However, since video file 11 has a variable number of bytes associated with each second of video, the calculation wrongly identifies the eleventh second of video as being the correct in-point. If the files were played from the in-points represented by arrow 15, the ninth second of audio would play simultaneously with the eleventh second of video. As can be appreciated by those persons skilled in the art, this is not a desired result. The playback of the audio and video from these in-points is "unsynched." Specifically, the video represented in FIG. 1 would appear to be slightly ahead of the audio, which would result in any spoken dialogue lagging behind the movements of a person's mouth.

A need exists, therefore, for a method for synchronizing elementary video and audio steams, where the video stream is represented by a variable bit rate file. A need also exists for software to organize and process the video stream prior to a first playing of the video stream so that the video stream can be easily synchronized with the audio stream.

BRIEF SUMMARY OF THE INVENTION

It is a general object of the present invention to provide a method for synchronizing an elementary audio stream with an elementary video stream. The audio stream is contained in a constant bit rate audio file, while the video stream is contained in a variable bit rate video file. The present invention is achieved by sampling a plurality of markers within the video file. As each marker is sampled, a time stamp and a memory stamp for the marker are recorded in a group of video pictures table (GVP table). The GVP table is typically created when the video file is loaded for the first time using software incorporating the method of the present invention. After creating the GVP table once, the GVP table can be accessed for any future synchronization needs associated with the video file.

When a user wishes to "jump" to a particular in-point in the video file, the user indicates a selected time position at which he wishes the video to begin playing. A video byte location is found by scanning the GVP table for the time stamp that matches the selected time position. When the time stamp is located, the corresponding memory stamp is the video byte location.

Since the audio file is a constant bit rate file, an audio byte location can be calculated based on the selected time position provided by the user. The audio byte location represents a location in the audio file that would allow synchronization of the audio and video streams if the audio file was played from the audio byte location and the video file was played from the video byte location. The audio byte location is calculated by multiplying a total bytes value for the audio file by the selected time position and then dividing this product by a total time value for the audio file.

After finding the audio byte location and the video byte location, the audio and video streams can be played synchronously by starting the audio file at the audio byte location and concurrently starting the video file at the video byte location.

Other objects, features, and advantages of the present invention will become apparent with reference to the drawings and detailed description which follow.

BRIEF DESCRIPTION OF THE DRAWINGS

FIG. 3 illustrates a GVP table which is created by the method of FIG. 2.

DETAILED DESCRIPTION OF THE PREFERRED EMBODIMENT

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical, electrical, and software changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
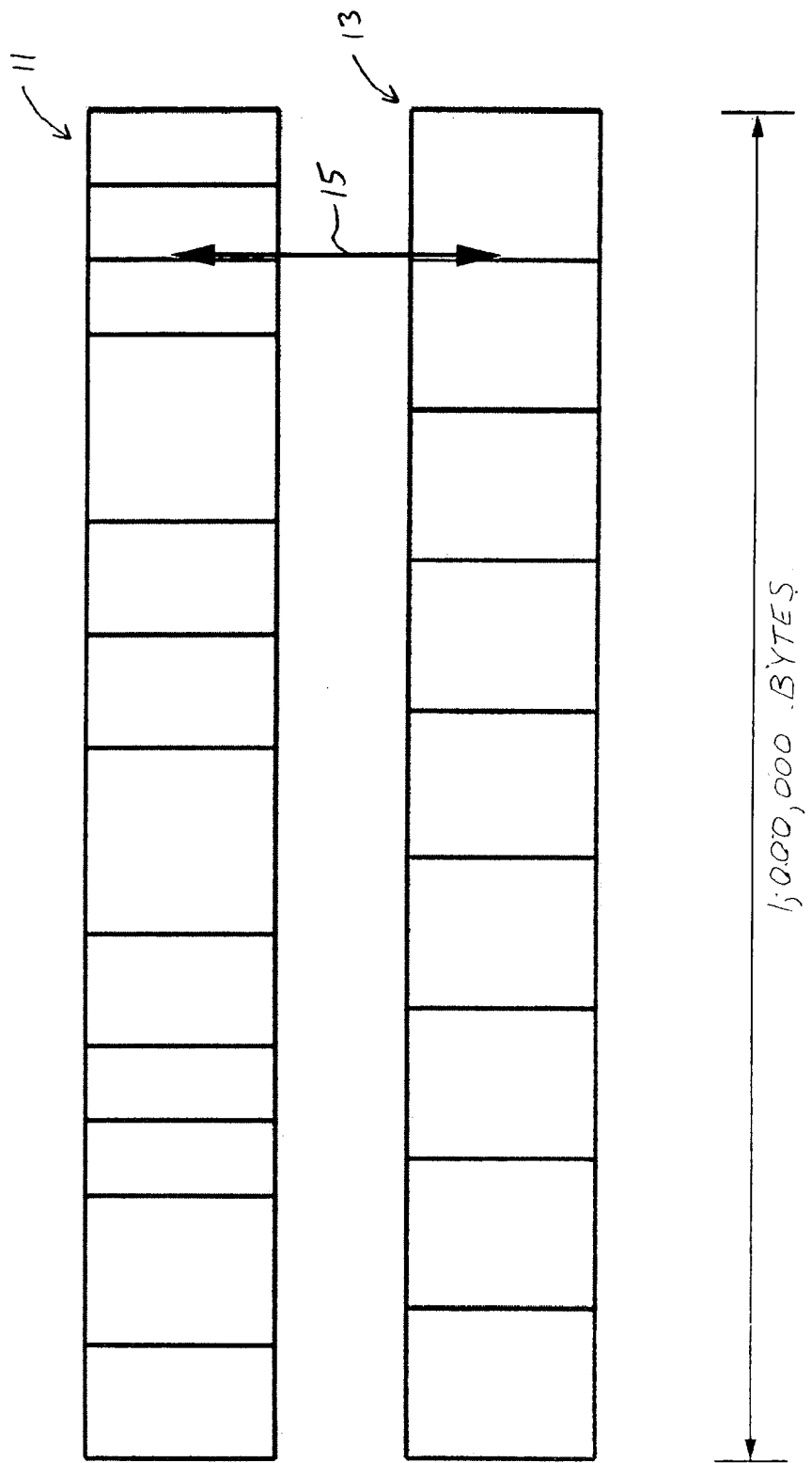
FIG. 1 schematically illustrates an MPEG-2 video file and an AC-3 audio file being used with a prior art method which attempts to synchronize elementary audio and video streams.
Figure 2:
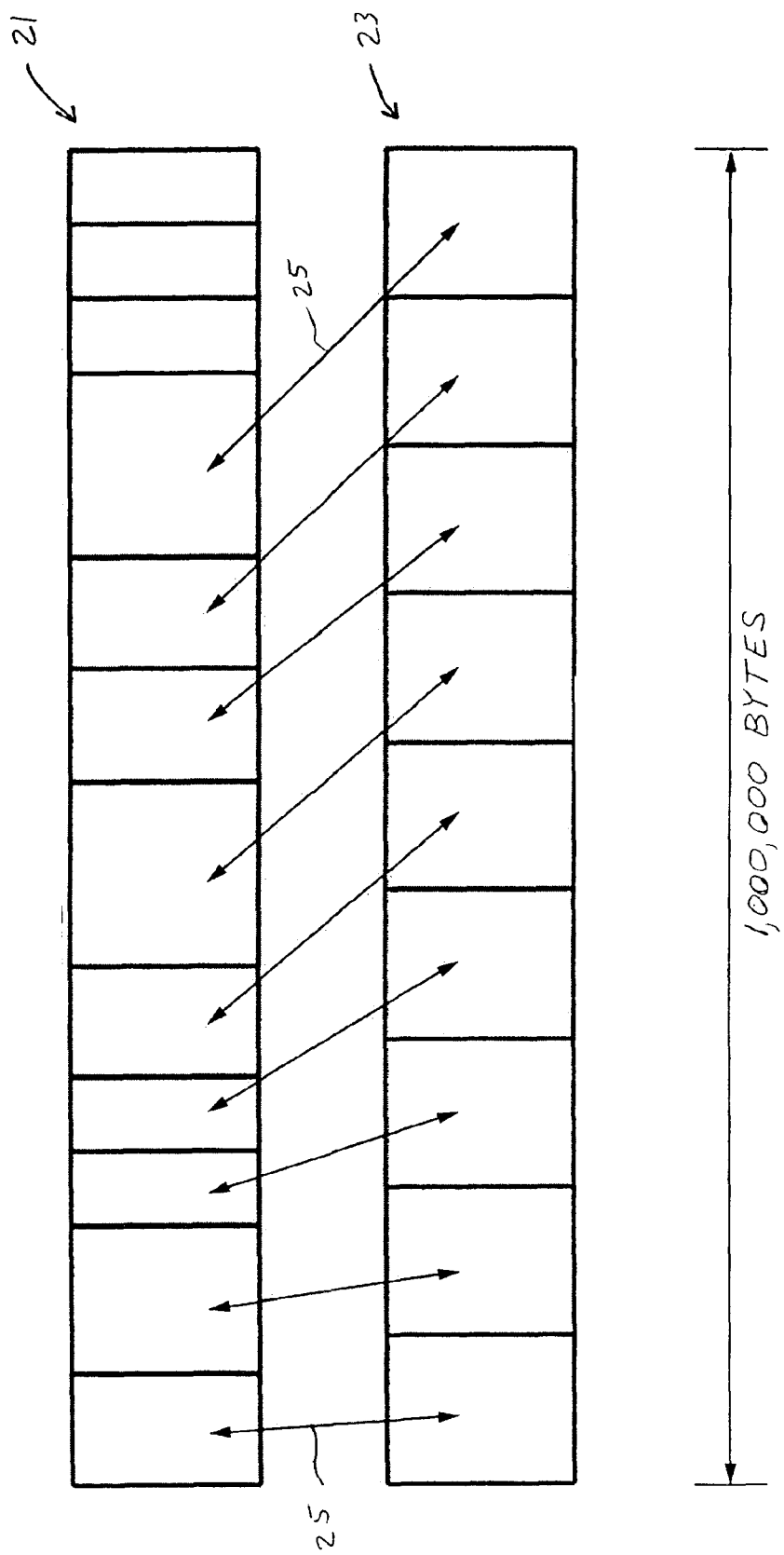
FIG. 2 schematically illustrates an MPEG-2 video file and an AC-3 audio file being used with a method of synchronizing elementary audio and video streams according to the present invention.

Referring to FIG. 2 in the drawings, an MPEG-2 video file 21 and an AC-3 audio file 23 are illustrated. Similar to the files shown in FIG. 1, video file 21 and audio file 23 are representative of elementary video and audio files that have undergone compression. Video file 21 has twelve seconds of video stored in 1,000,000 bytes, while audio file 23 has nine seconds of audio stored in the same 1,000,000 bytes.

A plurality of arrows 25 show the general result of using the method of the present invention. Instead of incorrectly synchronizing the video and audio as shown in FIG. 1, the method of the present invention allows each second of video to be correctly synchronized with the corresponding second of audio. In other words, when a user desires to view video at the ninth second of video file 21, the video will be played synchronously with the ninth second of audio from audio 23.

Every video file consists of a plurality of frames which are played in a particular order to create an illusion of motion. The present invention takes advantage of certain aspects of an MPEG-2 video format and the organization of frames within an MPEG-2 file. MPEG-2 files use markers called Groups of Pictures (GOP) to organize and arrange the frames within a video stream. Each GOP is a collection of single frames of video with a timestamp. For Digital Versatile Discs (DVDs), the MPEG-2 specification requires that no more than sixteen frames of video can be contained in any one GOP. Since one second of full motion video contains approximately thirty frames, it can be roughly stated that each GOP represents approximately one-half second of video.

Referring to FIG. 3 in the drawings, a GVP table 31 is a linear table that lists a time stamp 33 for each GOP and a corresponding memory stamp 35, which represents the byte location of that GOP in the video file. GVP table 31 is created by the method of the present invention when the MPEG-2 video file is loaded for the first time. During the initial loading, the video file is scanned, and the time stamp 33 and memory stamp 35 for each GOP are recorded in GVP table 31.

Because of the creation of GVP table 31, an initial delay is encountered during the first loading of the video file. However, for any subsequent uses of the same video file on the same computer, it is not necessary to recreate GVP table 31. GVP table 31 has a relatively small memory "footprint," taking up approximately 120,000 bytes of memory for every one hour of video.

Although the present invention has been described in terms of the structure of an MPEG-2 video file, the method could be used with any variable bit rate video file. The only requirement is that the file contain some provision for time stamping different portions of the video. A GVP table would be built based on the time stamps within the video and their corresponding byte locations.

Figure 4:
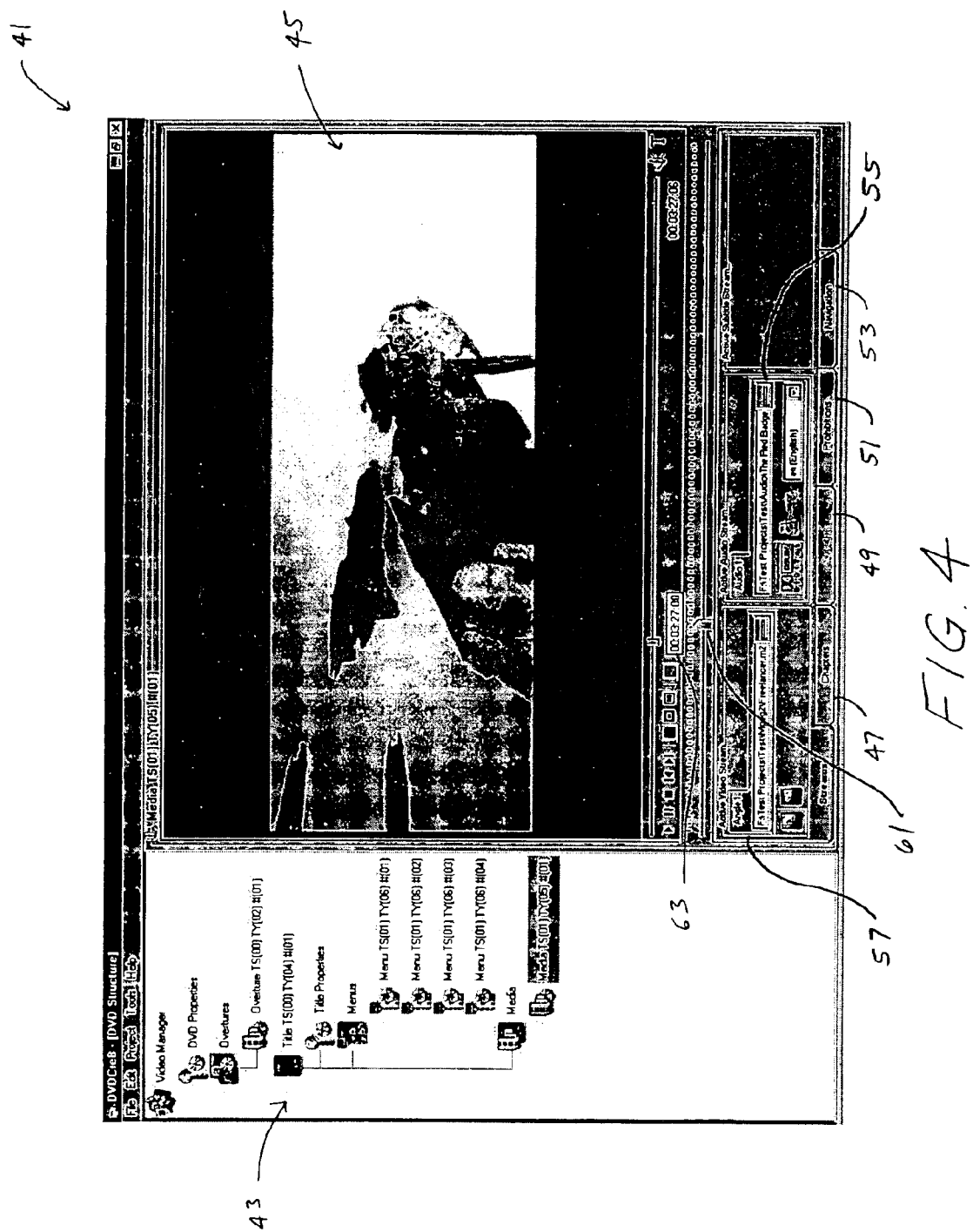
FIG. 4 illustrates a screen shot of a software program executed by a computer for performing the method of FIG. 2.
Figure 5:
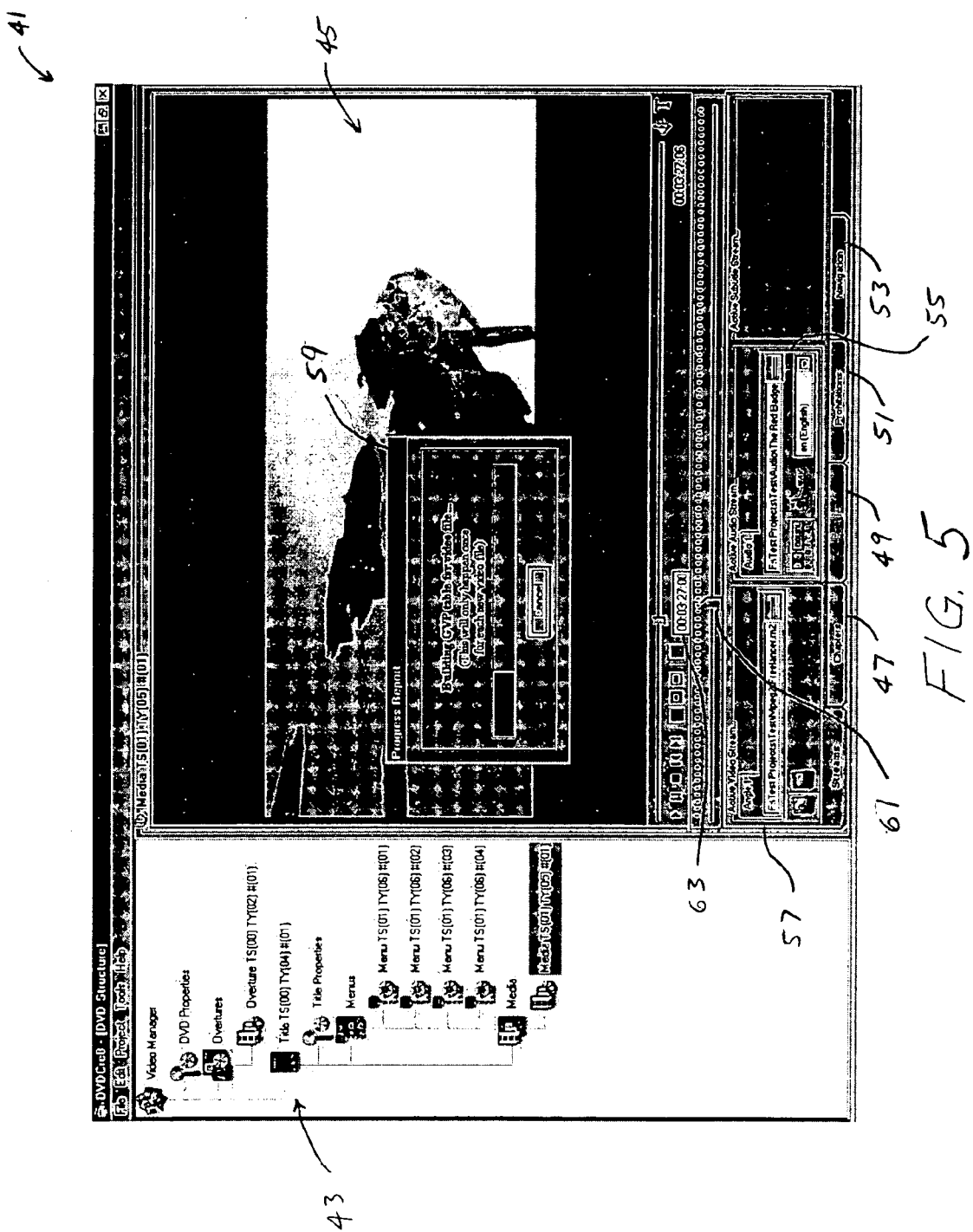
FIG. 5 illustrates a screen shot of a software program executed by a computer for performing the method of FIG. 2, the software program being shown in the process of building the GVP table of FIG. 3.

Although the method of the present invention could be used in any application where it is desired to synchronize a variable bit rate video file with an audio file, the method is preferably used with DVD authoring software executed by a computer. Referring to FIGS. 4 and 5 in the drawings, a screen shot of a DVD authoring package 41 is illustrated. DVD authoring package 41 is used to assemble and edit the various audio, video, and text components that will be added to a DVD. Most commonly, the audio and video that will be added to a DVD are represented by two separate files, one file containing an elementary audio stream and another file containing an elementary video stream. When creating the DVD, a user adds features such as chapters and subtitles at certain points in the video. To correctly position these features, it is highly desirous for the user to be able to move through the video stream while listening to the audio stream. The process of moving through the video stream in this way is referred to as "scrubbing."

As is common with many DVD authoring packages, DVD authoring package 41 includes a hierarchal structure 43 of the DVD being created and a video viewing area 45 for viewing video streams which are being added to the DVD. Also included are provisions for adding and editing chapters 47, subtitles 49, prohibitions 51, and navigation features 53.

A user begins the authoring process by loading an audio file at an active audio box 55 and a video file at an active video box 57. When the video file is first loaded into DVD authoring package 41, a GVP table 31 is created. As illustrated in FIG. 5, the creation of GVP table 31 is indicated by a progress report screen 59. After creating GVP table 31, the user can easily scrub to different portions of the video in order to add features to the DVD. The user indicates an in-point in the video file by dragging a video scrub bar 61. By dragging video scrub bar 61 to a particular point, the user has effectively entered a selected time position for the video file. The DVD authoring package 41 takes the selected time position provided by the user and searches the time stamps 33 listed in GVP table 31. After a time stamp 33 has been found that matches the selected time position, the memory stamp 35 associated with that time stamp 33 is recorded as a video byte location. A frame in the video at that video byte location is then displayed in video viewing area 45. Simultaneously, a time stamp indicator 63 displays the selected time position.

DVD authoring package 41 calculates an audio byte location based on the selected time position chosen by the user. The audio byte location represents a location in the audio file that would allow the audio and video streams to be synchronized, if the audio file was played from the audio byte location and the video file was played from the video byte location. The audio byte location is calculated by multiplying a total bytes value for the audio file by the selected time position. This product is then divided by a total time value for the audio file. The total bytes value represents the total number of bytes occupied by the audio file, while the total time value is the total amount of time required to play the audio file.

After a user has chosen the selected time position by dragging video scrub bar 61, the user can release video scrub bar 61 to begin playing the video and audio file. The video begins playing at the video byte location and is displayed in video viewing area 45. Simultaneously, the audio file begins to play at the audio byte location and can be heard by the user as the user watches the video.

The primary advantage of the present invention is that it allows synchronization of a variable bit rate video file with any audio file. During video editing, especially during DVD authoring, it is highly desirous to be able to scrub to any point in a video and have the video and audio play synchronously from that point.

Another advantage of the present invention is that it creates a GVP table upon an initial loading of a video file. The creation of the GVP table prevents lengthy search periods which would alternatively be performed in order to find a proper GOP for a selected time stamp. Since the GVP table is stored, a particular video file can be edited on many different occasions without having to recreate the GVP.

It should be apparent from the foregoing that an invention having significant advantages has been provided. While the invention is shown in only one of its forms, it is not just limited but is susceptible to various changes and modifications without departing from the spirit thereof.

I claim:

1. A method for synchronizing an elementary audio stream with an elementary video stream, the video stream having a plurality of markers containing information for displaying frames associated with the video stream, the method comprising the steps of:

sampling the markers in the video stream to obtain a time stamp and a memory stamp for each marker, the time stamp indicating a time position of the marker in the video stream, the memory stamp indicating a relative byte location for the marker in the video stream;

storing values of the time stamp and the memory stamp for each marker;

finding a video byte location in the video stream for a selected time position by reviewing stored values of the time stamps and memory stamps;

finding an audio byte location in the audio stream for the selected time position, wherein said finding further includes:

determining a total time value for the audio stream that represents an amount of time required to play the entire audio stream at a selected speed;

determining a total bytes value for the audio stream that represents the total number of bytes occupied by the audio stream;

calculating the audio byte location by multiplying the total bytes value by the selected time position and dividing by the total time value; and whereby the audio and video streams are synchronized for output at the audio byte location and the video byte location.

2. A method for synchronizing an elementary audio stream with an MPEG-2 video stream, the MPEG-2 video stream having a plurality of GOP markers, each GOP marker containing information for displaying a plurality of frames associated with that GOP marker, the method comprising the steps of:

sampling at least two of the GOP markers in the video stream to obtain a time stamp and a memory stamp for each GOP marker, the time stamp indicating a time position of the GOP marker in the video stream, the memory stamp indicating a relative byte location for the GOP marker in the video stream;

storing values of the time stamp and the memory stamp for each GOP marker in a GVP table;

finding a video byte location for a selected time position by reviewing the GVP table;

finding an audio byte location for the selected time position, wherein said finding further includes:
 determining a total time value for the audio stream that represents an amount of time required to play the entire audio stream at a selected speed;
 determining a total bytes value for the audio stream that represents the total number of bytes occupied by the audio stream;
 calculating the audio byte location by multiplying the total bytes value by the selected time position and dividing by the total time value; and whereby the audio and video streams are synchronized for output at the audio byte location and the video byte location.

3. A data processing system comprising a processor and a memory unit, wherein the data processing system performs the steps of:

sampling a plurality of markers in a video stream to obtain a time stamp and a memory stamp for each marker, the time stamp indicating a time position of the marker in the video stream, the memory stamp indicating a relative byte location for the marker in the video stream;

storing values of the time stamp and the memory stamp for each marker;

finding a video byte location in the video stream for a selected time position by reviewing stored values of the time stamps and memory stamps;

find an audio byte location in an audio stream for the selected time position, wherein said finding further includes:
 determining a total time value for the audio stream that represents an amount of time required to play the entire audio stream at a selected speed;
 determining a total bytes value for the audio stream that represents the total number of bytes occupied by the audio stream;
 calculating the audio byte location by multiplying the total bytes value by the selected time position and dividing by the total time value; and whereby the audio and video streams are synchronized for output at the audio byte location and the video byte location.

4. A software program product stored on a computer readable medium comprising:

instructions for sampling a plurality of markers in a video stream to obtain a time stamp and a memory stamp for each marker, the time stamp indicating a time position of the marker in the video stream, the memory stamp indicating a relative byte location for the marker in the video stream;

instructions for storing values of the time stamp and the memory stamp for each marker;

instructions for finding a video byte location in the video stream for a selected time position by reviewing stored values of the time stamps and memory stamps;

instructions for finding an audio byte location in an audio stream for the selected time position, wherein said finding further includes:
 determining a total time value for the audio stream that represents an amount of time required to play the entire audio stream at a selected speed;
 determining a total bytes value for the audio stream that represents the total number of bytes occupied by the audio stream;
 calculating the audio byte location by multiplying the total bytes value by the selected time position and dividing by the total time value;

whereby the audio and video streams are synchronized for output at the audio byte location and the video byte location.

\* \* \* \* \*